June 2, 1964 P. G. SMEE 3,135,927
DISTORTION FREE SINGLE STAGE AMPLIFIER
Filed June 30, 1960
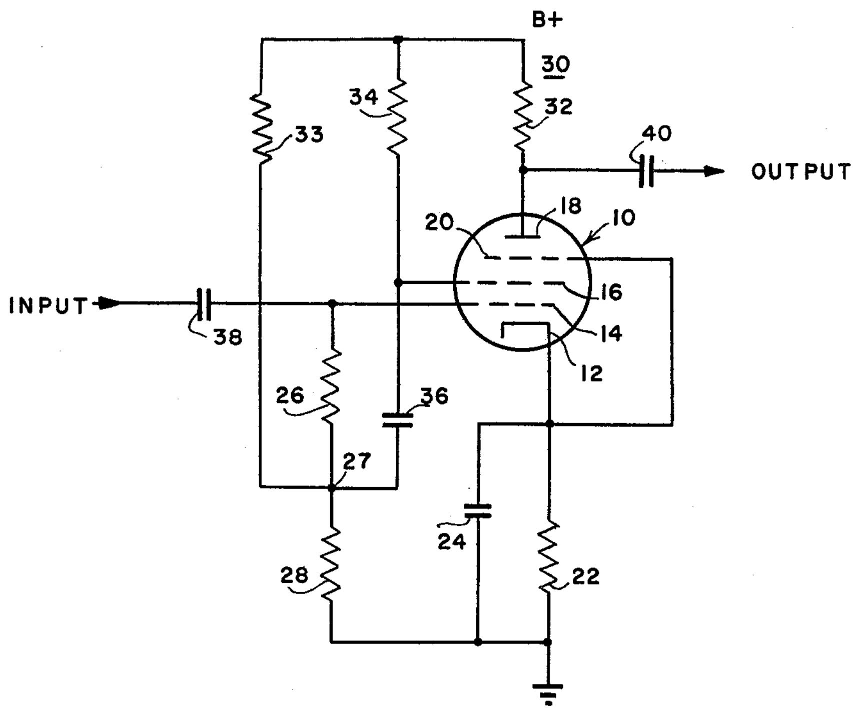
INVENTOR.
PETER G. SMEE
BY Isidore Match
ATTORNEY

United States Patent Office 3,135,927

Patented June 2, 1964

3,135,927

DISTORTION FREE SINGLE STAGE AMPLIFIER

Peter G. Smee, Lynchburg, Va., assignor to General Electric Company, a corporation of New York Filed June 30, 1960, Ser. No. 40,109
1 Claim. (Cl. 330—111)

This invention relates to amplifier circuits. More particularly, it relates to an arrangement in a single stage amplifier for providing an output signal having a minimum of distortion.

It is well known to utilize negative feedback to reduce the distortion in a signal appearing at the output terminals of an amplifier. In this connection, voltage feedback causes the output voltage from which the feedback is derived to reproduce accurately the signal voltage with respect to amplitude, wave shape, phase, freedom from hum, etc. On the other hand, current feedback acts in such a way as to cause the output current to reproduce accurately the signal voltage with respect to amplitude, wave shape, phase and freedom from hum.

In those situations where it is not necessary to obtain the total improvement in the output of the amplifier as would be provided by total negative feedback but wherein it is desired to substantially eliminate the distortion components, it is the practice to utilize cancellation techniques for removing the distortion components in the output of the amplifier. In such situations, it has been found that the normal circuit variations preclude consistent optimum cancellation.

It is, accordingly, an important object of this invention to provide an amplifier for producing an output relatively free from distortion which is simple, inexpensive and wherein the cancellation circuitry introduces no loading on the output of the amplifier.

It is a further object to provide an amplifier in accordance with the preceding object which enables a simple adjustment of the level of voltage utilized for cancellation.

It is another object of the invention to provide an amplifier in accordance with the preceding objects wherein the amplifier comprises a vacuum tube including at least a cathode, an anode, a control grid and a screen grid.

Generally speaking, and in accordance with the invention, there is provided in combination an electron discharge device comprising at least a cathode, an anode, a control grid and a screen grid, and a source of unidirectional potential for providing positive operating biasing potentials to said anode and said screen grid. The screen grid is not bypassed to a reference potential source whereby it functions as a second anode, the signal appearing thereat being opposite in phase to the signal applied to said amplifier. There is also provided means for feeding back a portion of the signal appearing at the screen grid to the control grid.

The features of this invention which are believed to be new are set forth with particularity in the appended claims. The invention, itself, may best be understood by reference to the following description when taken in conjunction with the accompanying drawing which discloses an embodiment of the circuit according to the invention.

In the drawing, the vacuum tube 10 comprises at least a cathode 12, a control grid 14, a screen grid 16, and an anode 18. The tube 10 may be a pentode and include a suppressor grid 20. Cathode 12 is connected to ground potential through a resistor 22 bypassed by a capacitor 24. Control grid 14 is returned to ground through a voltage divider comprising resistors 26 and 28. Suppressor grid 20 is tied to cathode 12. Anode 18 is connected to a source of positive potential 30 through a resistor 32 and screen grid 16 is connected to source 30 through a resistor 34, resistor 32 having a lesser value than resistor 34. Screen grid 16 is not bypassed to ground but instead is connected to the junction 27 of resistors 26 and 28 through a blocking capacitor 36. The input to the amplifier is applied to control grid 14 through a capacitor 38 and its output is taken at anode 18 through a capacitor 40. A resistor 33 is provided connected between junction 27 and source 30.

Since screen grid 16 is not bypassed to ground, the signal input to control grid 14 appears in amplified form at screen grid 16 but 180° reversed in phase. In other words, screen grid functions as a second anode in tube 10. Resistors 26 and 28 function as a potential divider to determine the degree of feedback to control grid 14. The voltage divider comprising resistors 33 and 28 is utilized to provide a relatively high D.C. potential at grid 14 whereby there is permitted the use of a large cathode resistor to afford stabilization of the D.C. operating point.

In the circuit of the figure, the ratio of the distortion component to the desired signal component is higher at screen grid 16 than at anode 18. Thus, if it were assumed that the distortion consists entirely of the second harmonic, at the anode, there could be present, for example 10 volts R.M.S. of fundamental and 0.5 volt R.M.S. of second harmonic and at the screen grid, there could be present 10 volts R.M.S. of fundamental and 1.0 volt of second harmonic. Thus, by feeding an appropriate amount of the signal from the screen grid to the control grid, there can effectively be cancelled out the second harmonic without cancelling out any portion of the fundamental. In fact, the reduction of gain resulting from the application of the feedback signal from the screen grid to the control grid in accordance with the invention is less than that which would occur if normal negative feedback were to be used.

As a practical embodiment of the circuit of the figure, for a particular design application, resistor 28 may have a value of 51K ohms, resistor 26 may have a value of 47K ohms, resistor 33 may have a value of 180K ohms, resistor 34 may have a value of 30K ohms; resistor 32 may have a value of 8.2K ohms and resistor 22 may have a value of 5.1K ohms. Capacitor 36 may have a value of 2 microfarad and capacitor 24 may have a value of 20 microfarad.

In the circuit of the practical embodiment, distortion is reduced from 1.8% to 0.3% of a ratio of 6:1. Using normal negative feedback techniques, the effect of applying sufficient feedback to reduce the distortion by 6:1 would reduce the gain also by approximately 6:1. Using the technique of the invention, the gain is reduced only 12 db or 4:1 (voltage gain).

Thus, the improvement attained in the distortion of the output signal in this circuit results from a cancellation effect rather than the usual negative feedback effect. The distortion components which exist in the signal appearing at the screen grid, while they are of the same type as those appearing at the anode are of a different amplitude with respect to the desired signal. Accordingly, there is a substantially consistent optimum cancellation despite circuit variations to effectively provide a significant improvement in the performance of the amplifier.

To provide such improvement, there is merely utilized a small number of inexpensive components which enable a simple adjustment of the amount of voltage utilized for concellation. It is, of course, seen that the cancellation voltage introduces no loading on the output of the amplifier.

While there has been described what is considered to be the preferred embodiment of this invention, it will be obvious to those skilled in the art that various changes and modifications may be made therein without departing from the invention and it is, therefore, aimed in the appended claim to cover all such changes and modifications as fall within the spirit and scope of the invention.

What is claimed as new and desired to be secured by Letters Patent of the United States is:

In combination, a vacuum tube comprising at least a cathode, an anode, a screen grid and a control grid, a source of unidirectional potential having a positive terminal, a first resistance of a chosen value connected between said anode and said positive terminal, a second resistance having a greater value than said first resistance connected between said screen grid and said positive terminal, a third resistance connected between said cathode and ground, a first capacitance connected across said third resistance, a series arrangement of fourth and fifth resistances connected between said control grid and ground, and means to feed back a signal reversed in phase and having a distortion component and a signal component, the amplitude of said feedback signal varying continuously with the amplitude variations of the input signal to said tube over the entire range of input signal variations, whereby the distortion components are substantially cancelled without cancelling the signal component at the anode, said feedback means including a capacitance connected between said screen grid and the junction of said fourth and fifth resistances.

References Cited in the file of this patent

UNITED STATES PATENTS

| | | |
|---|---|---|
| 2,702,839 | Hogue | Feb. 22, 1955 |
| 2,824,963 | Tedder | Feb. 25, 1958 |
| 2,926,309 | Norris | Feb. 23, 1960 |